United States Patent
Kiura et al.

(10) Patent No.: US 8,765,866 B2
(45) Date of Patent: Jul. 1, 2014

(54) ADDITIVE FOR A THERMOPLASTIC RESIN, A PROCESS FOR PRODUCING THE SAME, A THERMOPLASTIC RESIN COMPOSITION, AND A SHAPED ARTICLE

(75) Inventors: Masaaki Kiura, Otake (JP); Toshihiro Kasai, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 286 days.

(21) Appl. No.: 13/262,986

(22) PCT Filed: Apr. 9, 2010

(86) PCT No.: PCT/JP2010/002596
§ 371 (c)(1),
(2), (4) Date: Dec. 1, 2011

(87) PCT Pub. No.: WO2010/116756
PCT Pub. Date: Oct. 14, 2010

(65) Prior Publication Data
US 2012/0065305 A1     Mar. 15, 2012

(30) Foreign Application Priority Data

Apr. 10, 2009  (JP) ................ 2009-095948
Sep. 30, 2009  (JP) ................ 2009-226729

(51) Int. Cl.
*C08L 27/00* (2006.01)
*C08K 5/34* (2006.01)

(52) U.S. Cl.
USPC .......................................... 524/520; 524/101

(58) Field of Classification Search
USPC ............................................ 524/520
See application file for complete search history.

(56) References Cited

U.S. PATENT DOCUMENTS

| | | | | |
|---|---|---|---|---|
| 3,859,120 | A | * | 1/1975 | Schramm ............... 428/336 |
| 7,067,574 | B2 | | 6/2006 | Tomihashi et al. |
| 2001/0016627 | A1 | * | 8/2001 | Koshirai et al. ........ 525/192 |
| 2004/0143068 | A1 | * | 7/2004 | Honda et al. .......... 525/199 |

FOREIGN PATENT DOCUMENTS

| | | | |
|---|---|---|---|
| JP | 05 214184 | | 8/1993 |
| JP | 06 306212 | | 11/1994 |
| JP | 11 60871 | | 3/1999 |
| JP | 11 124478 | | 5/1999 |
| JP | 2000 290461 | | 10/2000 |
| JP | 2004-018638 | | 1/2004 |
| JP | 2004 155946 | | 6/2004 |
| JP | 2004155946 A | * 6/2004 | ............ C08L 101/00 |
| JP | 2005 36118 | | 2/2005 |
| WO | 02 090440 | | 11/2002 |

OTHER PUBLICATIONS

Translation of JP 2004-155946, Jun. 3, 2004.*
Extended European Search Report issued Sep. 6, 2012, in European Patent Application No. 10761459.6.
International Search Report issued Jul. 20, 2010 in PCT/JP10/002596 filed Apr. 9, 2010.
Office Action issued Mar. 24, 2014, in Chinese Patent Application No. 201080021346X, filed Apr. 9, 2010 (with English Translation).

* cited by examiner

*Primary Examiner* — Hui Chin
(74) *Attorney, Agent, or Firm* — Oblon, Spivak, McClelland, Maier & Neustadt, L.L.P.

(57) ABSTRACT

Disclosed is an additive for a thermoplastic resin, which provides a thermoplastic resin composition excellent in formability and also provides a shaped article excellent in surface appearance and flame retardance.
The additive for a thermoplastic resin comprises tetrafluoroethylene polymer (A) and alkyl methacrylate polymer (B) containing 50% by mass or more of units of alkyl methacrylate having an alkyl group with carbon numbers of 2 to 6.

7 Claims, No Drawings

ADDITIVE FOR A THERMOPLASTIC RESIN, A PROCESS FOR PRODUCING THE SAME, A THERMOPLASTIC RESIN COMPOSITION, AND A SHAPED ARTICLE

TECHNICAL FIELD

The present invention relates to an additive for a thermoplastic resin comprising a tetrafluoroethylene polymer and an alkyl methacrylate polymer, a process for producing the additive for a thermoplastic resin, a thermoplastic resin composition comprising a thermoplastic resin and the additive for a thermoplastic resin, and a shaped article provided with shaping of the thermoplastic resin composition.

This application insists on priority based on Japanese Patent Application No. 2009-095,948 filed on Apr. 10, 2009 and Japanese Patent Application No. 2009-226,729 filed on Sep. 30, 2009, and the subject matters are incorporated herein by reference.

BACKGROUND ART

A tetrafluoroethylene polymer has high crystallinity and a low intermolecular force, so that the tetrafluoroethylene polymer has a property of forming of fiber with a little stress.

Therefore, it is known that formability, machine properties, dropping proofness are improved with forming of fiber of the tetrafluoroethylene polymer in the case that the tetrafluoroethylene polymer is blended with a thermoplastic resin.

For example, in each of patent literatures 1 and 2, there is proposed a thermoplastic resin composition which is obtained with blending of a tetrafluoroethylene polymer with a thermoplastic resin.

In addition, in patent literature 3, there is proposed a thermoplastic resin composition which is obtained with blending of a modifier for thermoplastic resins, comprising a copolymer of methyl methacrylate and dodecyl methacrylate, and a tetrafluoroethylene polymer, with a thermoplastic resin.

Also, in patent literature 4, there is proposed a thermoplastic resin composition which is obtained with blending of a modifier for a thermoplastic resin, comprising a polymer containing methyl methacrylate units as main components and a tetrafluoroethylene polymer, with a thermoplastic resin.

CITATION LIST

Patent Literature

Patent literature 1: Japanese Patent Application Laid-Open No. Hei 5-214,184
Patent literature 2: Japanese Patent Application Laid-Open No. Hei 6-306,212
Patent literature 3: Japanese Patent Application Laid-Open No. Hei 11-124,478
Patent literature 4: International Patent Application Laid-Open No. 2002/090,440

SUMMARY OF INVENTION

Technical Problem

However, the thermoplastic resin composition in each of Patent literature 1 and Patent literature 2 is obtained with direct blending of a tetrafluoroethylene polymer with a thermoplastic resin, so that there are caused problems that dispersibility of each of the tetrafluoroethylene polymer in each of the thermoplastic resin is not excellent, and shaped articles provided are not excellent in surface appearance and flame retardance.

In addition, there are improved the above problems for the thermoplastic resin composition in Patent literature 3.

However, dispersibility of the tetrafluoroethylene polymer in the thermoplastic resin is not excellent, and a shaped article provided is not excellent in surface appearance and flame retardance because the thermoplastic resin composition is obtained with the use of a copolymer of methyl methacrylate, which is an alkyl methacrylate having alkyl group with a carbon number of 1, and dodecyl methacrylate, which is an alkyl methacrylate having alkyl group with carbon numbers of 12, as an additive for a thermoplastic resin.

Also, the thermoplastic resin composition in Patent literature 4 as well as Patent literature 3 is obtained with the use of a polymer containing units of methyl methacrylate, which are units of alkyl methacrylate having alkyl group with a carbon number of 1, as an additive for a thermoplastic resin, so that the tetrafluoroethylene polymer is insufficient for dispersibility in the thermoplastic resin and a shaped article provided is insufficient for surface appearance and flame retardance.

The present invention is to provide an additive for a thermoplastic resin providing a thermoplastic resin composition excellent in formability, and providing a shaped article excellent in surface appearance and flame retardance.

Solution to Problem

The present invention is an additive for a thermoplastic resin comprising tetrafluoroethylene polymer (A) and alkyl methacrylate polymer (B) containing 50% by mass or more of alkyl methacrylate units having alkyl group with carbon numbers of 2 to 6.

In addition, the present invention is a thermoplastic resin composition comprising a thermoplastic resin and the additive for a thermoplastic resin.

Also, the present invention is a shaped article obtained with shaping of the thermoplastic resin composition.

In addition, the present invention is a process for producing the additive for a thermoplastic resin comprising powdering a latex comprising tetrafluoroethylene polymer (A) and alkyl methacrylate polymer (B) containing 50% by mass or more of an alkyl methacrylate unit having alkyl group with carbon numbers of 2 to 6.

Advantageous Effects of Invention

With the use of the additive for a thermoplastic resin of the present invention, there can be raised dispersibility of the tetrafluoroethylene polymer in the thermoplastic resin, and there can be provided the shaped article excellent in surface appearance and flame retardance.

In addition, with the use of the additive for a thermoplastic resin of the present invention, there can be provided the thermoplastic resin composition excellent in formability.

DESCRIPTION OF EMBODIMENTS

The additive for a thermoplastic resin of the present invention contains tetrafluoroethylene polymer (A).

Tetrafluoroethylene polymer (A) of the present invention is obtained with polymerization of monomer component (a) containing tetrafluoroethylene (a1).

Monomer component (a) may contain other monomer (a2) copolymerizable with tetrafluoroethylene (a1) in the range without giving a loss of characteristics of the tetrafluoroethylene polymer.

Examples other monomer (a2) include hexafluoropropylene, chlorotrifluoroethylene, fluoroalkylethylene, and perfluoroalkyl vinyl ether.

Other monomer (a2) may be used alone or in combination.

For the composition ratio of monomer component (a), the content of tetrafluoroethylene (a1) is preferably 80% by mass or more and the content of other monomer (a2) is preferably 20% by mass or less, and the content of tetrafluoroethylene (a1) is more preferably 90% by mass or more and the content of other monomer (a2) is more preferably 10% by mass or less, in 100% by mass of monomer component (a) from the viewpoint of excellent formability of the thermoplastic resin composition provided.

The polymerization method of monomer component (a) is not limited, and well-known polymerization methods may be applied.

The mass average molecular weight of tetrafluoroethylene polymer (A) in the present invention is preferably 1 million to 50 million and more preferably 3 million to 30 million.

When the mass average molecular weight of tetrafluoroethylene polymer (A) is 1 million or more, the thermoplastic resin composition provided is excellent in formability.

In addition, when the mass average molecular weight of tetrafluoroethylene polymer (A) is 50 million or less, tetrafluoroethylene polymer (A) is excellent in dispersibility in the thermoplastic resin and the shaped article provided is excellent in surface appearance and flame retardance.

The mass average particle size of tetrafluoroethylene polymer (A) of the present invention is preferably 50 to 1,000 nm and more preferably 50 to 500 nm.

When the mass average particle size of tetrafluoroethylene polymer (A) is 50 nm or more, the thermoplastic resin composition provided shows improvement of a melt tension and is excellent in formability.

In addition, when the mass average particle size of tetrafluoroethylene polymer (A) is 1,000 nm or less, tetrafluoroethylene polymer (A) is excellent in latex stability, restraint of generation of an agglomerate, tetrafluoroethylene polymer (A) is excellent in dispersibility in the thermoplastic resin, and the shaped article provided is excellent in surface appearance and flame retardance.

Examples of a commercial product of the latex of tetrafluoroethylene polymer (A) of the present invention include "Fluon AD911L", "Fluon AD912L", "Fluon AD915L", "Fluon AD938L", "Fluon AD939L", and "Fluon AD939E" (trade names, made in Asahi Glass Co., Ltd.).

These latices of tetrafluoroethylene polymer (A) may be used alone or in combination.

The additive for thermoplastic resin of the present invention contains alkyl methacrylate polymer (B) containing 50% by mass of alkyl methacrylate units having alkyl group with carbon numbers of 2 to 6.

The content of alkyl methacrylate units having alkyl group with carbon numbers of 2 to 6 in alkyl methacrylate polymer (B) is 50% by mass or more, preferably 70% by mass or more, more preferably 80% by mass or more, and further more preferably 90% by mass or more, in 100% by mass of the alkyl methacrylate polymer.

When the content of alkyl methacrylate units having alkyl group with carbon numbers of 2 to 6 in alkyl methacrylate polymer (B) is 50% by mass or more, tetrafluoroethylene polymer (A) is excellent in dispersibility in the thermoplastic resin and the shaped article provided is excellent in surface appearance and flame retardance.

Alkyl methacrylate polymer (B) of the present invention containing 50% by mass or more of alkyl methacrylate units having alkyl group with carbon numbers of 2 to 6 is obtained with polymerization of monomer component (b) containing 50% by mass or more of alkyl methacrylate (b1) having alkyl group with carbon numbers of 2 to 6.

Examples of alkyl methacrylate (b1) having alkyl group with carbon numbers of 2 to 6 include ethyl methacrylate having carbon numbers of 2; n-propyl methacrylate and i-propyl methacrylate having carbon numbers of 3; n-butyl methacrylate, i-butyl methacrylate, sec-butyl methacrylate, and t-butyl methacrylate having carbon numbers of 4; n-pentyl methacrylate, 1-methylbutyl methacrylate, 2-methylbutyl methacrylate, 3-methylbutyl methacrylate, dimethylpropyl methacrylate, 3-pentyl methacrylate, and cyclopentyl methacrylate having carbon numbers of 5; and n-hexyl methacrylate, methylpentyl methacrylate, dimethylbutyl methacrylate, ethylbutyl methacrylate, trimethylpropyl methacrylate, 2-hexyl methacrylate, 3-hexyl methacrylate, methylcyclopentyl methacrylate, and cyclohexyl methacrylate having carbon numbers of 6.

Alkyl methacrylate (b1) having alkyl group with carbon numbers of 2 to 6 may be used alone or in combination.

When carbon numbers of alkyl group of alkyl methacrylate (b1) is 2 or more, tetrafluoroethylene polymer (A) is excellent in dispersibility in the thermoplastic resin and the shaped article provided is excellent in surface appearance and flame retardance.

In addition, when carbon numbers of alkyl group of alkyl methacrylate (b1) is 6 or less, alkyl methacrylate polymer (B) has sufficient glass transition temperature, so that the additive for a thermoplastic resin provided is excellent in handling property of powder.

In alkyl methacrylate (b1), it is preferable using n-butyl methacrylate, i-butyl methacrylate, sec-butyl methacrylate, and t-butyl methacrylate in which there are 4 carbon numbers of alkyl groups of alkyl methacrylate (b1) from the viewpoint that tetrafluoroethylene polymer (A) is excellent in dispersibility in the thermoplastic resin and the shaped article provided is excellent in surface appearance and flame retardance.

Also, it is more preferable using i-butyl methacrylate, t-butyl methacrylate, and sec-butyl methacrylate which have branched structures of alkyl group from the viewpoint that the additive for a thermoplastic resin provided is excellent in handling property of powder.

In addition, it is further more preferably using i-butyl methacrylate from the viewpoint that the shaped article provided is excellent in surface appearance and flame retardance.

Monomer component (b) containing alkyl methacrylate (b1) may contain other monomer (b2) copolymerizable with alkyl methacrylate (b1) in the extent that dispersibility of tetrafluoroethylene polymer (A) is not deteriorated.

Examples of other monomer (b2) include aromatic vinyl monomers such as styrene, α-methyl styrene, and chlorostyrene; alkyl acrylates such as methyl acrylate, ethyl acrylate, n-propyl acrylate, n-butyl acrylate, i-butyl acrylate, t-butyl acrylate, n-hexyl acrylate, cyclohexyl acrylate, n-octyl acrylate, 2-ethylhexyl acrylate, dodecyl acrylate, and stearyl acrylate; alkyl methacrylates having alkyl group without carbon numbers of 2 to 6 such as methyl methacrylate, n-octyl methacrylate, 2-ethyl hexyl methacrylate, dodecyl methacrylate, and stearyl methacrylate; phenyl (meth)acrylate; carboxyl group-containing monomers such as (meth)acrylic acid and carboxyethyl (meth)acrylate; vinyl cyanides such as (meth)acrylonitrile; vinyl ethers such as vinyl methyl ether and vinyl ethyl ether; vinyl carboxylates such as vinyl acetate and vinyl butyrate; and olefins such as ethylene, propylene and butylene.

In other monomers (b2), it is preferable using alkyl acrylates such as methyl acrylate, ethyl acrylate and n-butyl acrylate from the viewpoint of restraint of thermal decomposition of alkyl methacrylate polymer (B).

Other monomer (b2) may be used alone or in combination.

It is noted that "(meth)acrylate" shows "acrylate" or "methacrylate" in the present specification.

For the composition ratio of monomer component (b), the content of alkyl methacrylate (b1) is 50% by mass or more and the content of other monomer (b2) is 50% by mass or less, the content of alkyl methacrylate (b1) is preferably 70% by mass or more and the content of other monomer (b2) is preferably 30% by mass or less, the content of alkyl methacrylate (b1) is more preferably 80% by mass or more and the content of other monomer (b2) is more preferably 20% by mass or less, and the content of alkyl methacrylate (b1) is further more preferably 90% by mass or more and the content of other monomer (b2) is further more preferably 10% by mass or less, in 100% by mass of monomer component (b).

When the content of alkyl methacrylate (b1) is 50% by mass or more, tetrafluoroethylene polymer (A) is excellent in dispersibility in the thermoplastic resin and the shaped article provided is excellent in surface appearance and flame retardance.

When the content of other monomer (b2) is 50% by mass or less, tetrafluoroethylene polymer (A) is excellent in dispersibility in the thermoplastic resin and the shaped article provided is excellent in surface appearance and flame retardance.

There is restrained thermal decomposition of alkyl methacrylate polymer (B) by the use of alkyl acrylates such as methyl acrylate, ethyl acrylate, and n-butyl acrylate as other monomers (b2).

For the composition ratio of monomer component (b) in the case of using the alkyl acrylate as other monomers (b2), the content of alkyl methacrylate (b1) is preferably 50 to 99.9% by mass, the content of the alkyl acrylate is preferably 0.1 to 50% by mass, and the content of other monomer (b2) except the alkyl acrylate is preferably 49.9% by mass or less, in 100% by mass of monomer component (b).

Also, the content of alkyl methacrylate (b1) is preferably 70 to 99.8% by mass, the content of the alkyl acrylate is preferably 0.2 to 30% by mass, and the content of other monomer (b2) except the alkyl acrylate is preferably 29.8% by mass or less, in 100% by mass of monomer component (b).

In addition, the content of alkyl methacrylate (b1) is more preferably 80 to 99.7% by mass, the content of the alkyl acrylate is more preferably 0.3 to 20% by mass, and the content of other monomer (b2) except the alkyl acrylate is more preferably 19.7% by mass or less, in 100% by mass of monomer component (b).

Also, the content of alkyl methacrylate (b1) is further more preferably 90 to 99.5% by mass, the content of the alkyl acrylate is further more preferably 0.5 to 10% by mass and the content of other monomer (b2) except the alkyl acrylate is further more preferably 9.5% by mass or less, in 100% by mass of monomer component (b).

When the content of alkyl methacrylate (b1) is 50% by mass or more, tetrafluoroethylene polymer (A) is excellent in dispersibility in the thermoplastic resin and the shaped article provided is excellent in surface appearance and flame retardance.

In addition, when the content of alkyl methacrylate (b1) is 99.9% by mass or less, alkyl methacrylate polymer (B) is excellent in restraint of thermal decomposition.

When the content of the alkyl acrylate is 0.1% by mass or more, alkyl methacrylate polymer (B) is excellent in restraint of thermal decomposition.

Also, when the content of the alkyl acrylate is 50% by mass or less, tetrafluoroethylene polymer (A) is excellent in dispersibility in the thermoplastic resin and the shaped article provided is excellent in surface appearance and flame retardance.

When the content of other monomer (b2) except the alkyl acrylate is 49.9% by mass or less, tetrafluoroethylene polymer (A) is excellent in dispersibility in the thermoplastic resin, the shaped article provided is excellent in surface appearance and flame retardance, and alkyl methacrylate polymer (B) is excellent in restraint of thermal decomposition.

For the polymerization method of the monomer component (b), well-known polymerization methods may be applied.

Examples of the polymerization method of the monomer component (b) include emulsion polymerization, soap-free emulsion polymerization, micro suspension polymerization, suspension polymerization, bulk polymerization, and solution polymerization.

In these polymerization methods, emulsion polymerization and soap-free emulsion polymerization are preferable, and emulsion polymerization is more preferable from the viewpoint that there is easy blending of tetrafluoroethylene polymer (A) and alkyl methacrylate polymer (B).

When a polymerization method such as emulsion polymerization or soap-free emulsion polymerization is applied as a polymerization method of monomer component (b), the particle structure may have a single-layered structure or a multilayer structure.

However, in the case of a multilayer structure, a multilayer structure with 3 layers or less is preferable from the viewpoint of a production cost.

For an emulsifier in emulsion polymerization, well-known emulsifiers may be used.

Examples of the emulsifier include anionic emulsifiers, nonionic emulsifiers, polymer emulsifiers, reactive anionic emulsifiers, and reactive nonionic emulsifiers.

Examples of the anionic emulsifier include "Newcol 560SF", "Newcol 562SF", "Newcol 707SF", "Newcol 707SN", "Newcol 714SF", "Newcol 723SF", "Newcol 740SF", "Newcol 2308SF", "Newcol 2320SN", "Newcol 1305SN", "Newcol 271A", "Newcol 271NH", "Newcol 210", "Newcol 220", "Newcol RA331", and "Newcol RA332" (trade names, made in Nippon Nyukazai Co., Ltd.); "Latemul B-118E", "Levenol WZ", and "Neopelex G15" (trade names, made in Kao Corporation); and "Hitenol N08" (trade name, made in Dai-ichi Kogyo Seiyaku Co., Ltd.).

Examples of the nonionic emulsifier include "Nonipol 200" and "Newpol PE-68" (trade names, made in Sanyo Chemical Industries Ltd.).

Examples of the polymer emulsifier include polyvinyl alcohol, polyhydroxyethyl (meth)acrylate, polyhydroxypropyl (meth)acrylate, and polyvinyl pyrrolidone.

Examples of the reactive anionic emulsifier include "Antox MS-60" and "Antox MS-2N" (trade names, made in Nippon Nyukazai Co., Ltd.); "Eleminol JS-2" (trade name, made in Sanyo Chemical Industries Ltd.); "Latemul S-120", "Latemul S-180", "Latemul S-180A", and "Latemul PD-104" (trade names, made in Kao Corporation); "Adeka Reasoap SR-10" and "Adeka Reasoap SE-10" (trade names, made in ADEKA Co., Ltd.); and "Aquaron KH-05", "Aquaron KH-10", and "Aquaron HS-10" (trade names, made in Dai-ichi Kogyo Seiyaku Co., Ltd.).

Examples of the reactive nonionic emulsifier include "Adeka Reasoap NE-10", "Adeka Reasoap ER-10", "Adeka Reasoap NE-20", "Adeka Reasoap ER-20", "Adeka Reasoap NE-30", "Adeka Reasoap ER-30", "Adeka Reasoap NE-40" and "Adeka Reasoap ER-40" (trade names, made in ADEKA Co., Ltd.), and "Aquaron RN-10", "Aquaron RN-20", "Aquaron RN-30" and "Aquaron RN-50" (trade names, made in Dai-ichi Kogyo Seiyaku Co., Ltd.).

These emulsifiers may be used alone or in combination.

For a polymerization initiator in the polymerization of monomer component (b), well-known polymerization initiators may be used.

Examples of the polymerization initiator include persulfuric acid compounds such as potassium persulfate, sodium persulfate, and ammonium persulfate; oil-soluble azo compounds such as azobisisobutyronitrile, 2,2'-azobis-(2-methyl butyronitrile), 2,2'-azobis-(2,4-dimethyl valeronitrile), 2,2'-azobis-(4-methoxy-2,4-dimethyl valeronitrile), and 2-phenylazo-4-methoxy-2,4-dimethyl valeronitrile; water-soluble azo compounds such as 2,2'-azobis {2-methyl-N-[1,1-bis(hydroxymethyl)-2-hydroxyethyl]propionamide}, 2,2'-azobis {2-methyl-N-[2-(1-hydroxyethyl)]propionamide}, 2,2'-azobis {2-methyl-N-[2-(1-hydroxybutyl)]propionamide}, 2,2'-azobis-[2-(5-methyl-2-imidazoline-2-yl) propane and the salt, 2,2'-azobis-[2-(2-imidazoline-2-yl) propane and the salt, 2,2'-azobis-[2-(3, 4, 5, 6-tetrahydropyrimidine-2-yl) propane and the salt, 2,2'-azobis-{2-[1-(2-hydroxyethyl)-2-imidazoline-2-yl]propane} and the salt, 2,2'-azobis-(2-methyl propionamide) and the salt, 2,2'-azobis-(2-methyl propinamidine) and the salt, 2,2'-azobis-[N-(2-carboxyethyl)-2-methyl propionamidine] and the salt; and organic peroxides such as benzoyl peroxide, cumene hydroperoxide, t-butyl hydroperoxide, t-butyl peroxy-2-ethyl hexanoate, and t-butyl peroxy isobutyrate.

Also, in the case that monomer component (b) is polymerized with emulsion polymerization, reducing agents such as sodium bisulphite, ferrous sulfate, and ascorbate may be used in combination with the above persulfuric acid compound and the above organic peroxide.

These polymerization initiators may be used alone or in combination.

The mass average molecular weight of alkyl methacrylate polymer (B) of the present invention is preferably 5,000 to 5 million, more preferably 7,000 to 1 million, further more preferably 8,000 to 200 thousand, and the most preferably 10 thousand to 50 thousand.

When the mass average molecular weight of alkyl methacrylate polymer (B) is 5,000 or more, alkyl methacrylate polymer (B) has a sufficient glass transition temperature, so that the additive for a thermoplastic resin provided is excellent in handling property of powder.

In addition, when the mass average molecular weight of alkyl methacrylate polymer (B) is 5 million or less, tetrafluoroethylene polymer (A) is excellent in dispersibility in the thermoplastic resin, and the shaped article provided is excellent in surface appearance and flame retardance.

For a method for adjusting a mass average molecular weight, well-known methods may be applied.

Examples of the method for adjusting a mass average molecular weight include a method of adjusting quantity of the polymerization initiator and quantity of a chain transfer agent.

For the chain transfer agent, well-known chain transfer agents may be used.

Examples of the chain transfer agent include mercaptans such as n-dodecyl mercaptan, t-dodecyl mercaptan, n-octyl mercaptan, n-tetradecyl mercaptan, n-hexyl mercaptan, and n-butyl mercaptan; halogen compounds such as carbon tetrachloride and ethylene bromide; and α-methyl styrene dimer.

These chain transfer agents may be used alone or in combination.

The amount of the chain transfer agent is not specifically limited, and may be determined based on a kind of the chain transfer agent to be used or a composition of monomer component (b).

The mass average particle size of alkyl methacrylate polymer (B) of the present invention is preferably 30 to 1,000 nm, more preferably 30 to 500 nm, further more preferably 30 to 300 nm, and the most preferably 30 to 100 nm.

In the case that the mass average particle size of alkyl methacrylate polymer (B) is 30 nm or more, production with emulsion polymerization may be applied.

In addition, when the mass average particle size of alkyl methacrylate polymer (B) is 1,000 nm or less, the particle of alkyl methacrylate polymer (B) can coat the particle of tetrafluoroethylene polymer (A) with a high level, so that tetrafluoroethylene polymer (A) is excellent in restraint of generation of an agglomerate, tetrafluoroethylene polymer (A) is excellent in dispersibility in the thermoplastic resin, and the shaped article provided is excellent in surface appearance and flame retardance.

Alkyl methacrylate polymer (B) of the present invention may be used alone, or may be used in combination with at least two polymers which are different from each other in a composition, molecular weight, or particle diameter.

The additive for a thermoplastic resin of the present invention comprises tetrafluoroethylene polymer (A) and alkyl methacrylate polymer (B).

The additive for a thermoplastic resin preferably comprises 1 to 75% by mass of tetrafluoroethylene polymer (A) and 25 to 99% by mass of alkyl methacrylate polymer (B), in 100% by mass of the additive for a thermoplastic resin.

When the content of tetrafluoroethylene polymer (A) is 1% by mass or more, the shaped article provided is excellent in flame retardance, and the thermoplastic resin composition provided shows improvement of a melt tension and is excellent in formability.

In addition, when the content of tetrafluoroethylene polymer (A) is 75% by mass or less, tetrafluoroethylene polymer (A) is excellent in dispersibility in the thermoplastic resin, and the shaped article provided is excellent in surface appearance and restraint of reduction of flame retardance.

When the content of alkyl methacrylate polymer (B) is 25% by mass or more, tetrafluoroethylene polymer (A) is excellent in dispersibility in the thermoplastic resin, and the shaped article provided is excellent in surface appearance and restraint of reduction of flame retardance.

In addition, when the content of alkyl methacrylate polymer (B) is 99% by mass or less, the shaped article provided is excellent in flame retardance, and the thermoplastic resin composition provided shows improvement of a melt tension and is excellent in formability.

It is noted that preferable composition of the additive for a thermoplastic resin is different in the case that the additive for a thermoplastic resin is used to provide the shaped article excellent in surface appearance or in the case that the additive for a thermoplastic resin is used to provide the shaped article excellent in flame retardance.

In the case that the additive for a thermoplastic resin is used to provide the shaped article excellent in surface appearance, the additive for a thermoplastic resin preferably comprises 1 to 60% by mass of tetrafluoroethylene polymer (A) and 40 to 99% by mass of alkyl methacrylate polymer (B), in 100% by mass of the additive for a thermoplastic resin.

When the content of tetrafluoroethylene polymer (A) is 1% by mass or more, the thermoplastic resin composition provided shows improvement of a melt tension and is excellent in formability.

In addition, when the content of tetrafluoroethylene polymer (A) is 60% by mass or less, tetrafluoroethylene polymer (A) is excellent in dispersibility in the thermoplastic resin and the shaped article provided is excellent in surface appearance.

When the content of alkyl methacrylate polymer (B) is 40% by mass or more, tetrafluoroethylene polymer (A) is excellent in dispersibility in the thermoplastic resin and the shaped article provided is excellent in surface appearance.

In addition, when the content of alkyl methacrylate polymer (B) is 99% by mass or less, the thermoplastic resin composition provided shows improvement of a melt tension and is excellent in formability.

In the case that the additive for a thermoplastic resin is used to provide the shaped article excellent in flame retardance, the additive for a thermoplastic resin preferably comprises 15 to 75% by mass of tetrafluoroethylene polymer (A) and 25 to 85% by mass of alkyl methacrylate polymer (B), in 100% by mass of the additive for a thermoplastic resin.

When the content of tetrafluoroethylene polymer (A) is 15% by mass or more, the shaped article provided is excellent in flame retardance.

In addition, when the content of tetrafluoroethylene polymer (A) is 75% by mass or less, tetrafluoroethylene polymer (A) is excellent in dispersibility in the thermoplastic resin, and the shaped article provided is excellent in restraint of reduction of flame retardance.

When the content of alkyl methacrylate polymer (B) is 25% by mass or more, tetrafluoroethylene polymer (A) is excellent in dispersibility in the thermoplastic resin, and the shaped article provided is excellent in restraint of reduction of flame retardance.

In addition, the content of alkyl methacrylate polymer (B) is 85% by mass or less, the shaped article provided is excellent in flame retardance.

In the case that the additive for a thermoplastic resin is used to provide the shaped article excellent in surface appearance and flame retardance, the additive for a thermoplastic resin preferably comprises 15 to 60% by mass of tetrafluoroethylene polymer (A) and 40 to 85% by mass of alkyl methacrylate polymer (B), and preferably comprises 20 to 55% by mass of tetrafluoroethylene polymer (A) and 45 to 80% by mass of alkyl methacrylate polymer (B).

When the content of tetrafluoroethylene polymer (A) is 15% by mass or more, the shaped article provided is excellent in flame retardance.

In addition, when the content of tetrafluoroethylene polymer (A) is 60% by mass or less, the shaped article provided is excellent in surface appearance.

When the content of alkyl methacrylate polymer (B) is 40% by mass or more, the shaped article provided is excellent in surface appearance.

In addition, when the content of alkyl methacrylate polymer (B) is 85% by mass or less, the shaped article provided is excellent in flame retardance.

Examples of a blending method of tetrafluoroethylene polymer (A) and alkyl methacrylate polymer (B) include a latex-blending method which is a method of blending of a latex of tetrafluoroethylene polymer (A) and a latex of alkyl methacrylate polymer (B), and a method of polymerization with existence that monomer component (b) is polymerized in the presence of tetrafluoroethylene polymer (A).

In these methods, the latex-blending method is preferable from the viewpoint that a thermal influence to tetrafluoroethylene polymer (A) is a little, coagulation of the tetrafluoroethylene polymer particle is restrained, and the shaped article provided is excellent in surface appearance.

It is not limited a method that powder of the solid content of the resin is provided with the use of the latex of the additive for a thermoplastic resin produced with a latex-blending method or a method of polymerization with existence, and well-known methods may be applied.

In these methods, a coagulation method and a spray-drying method are preferable, and the coagulation method is more preferable from the viewpoint that coagulation of the tetrafluoroethylene polymer particle is restrained.

Examples of the coagulation method include the following method.

The latex of the additive for a thermoplastic resin is contacted with a coagulant at 30 to 90° C. and a slurry is obtained with coagulation under agitation, then the slurry is dehydrated and dried.

Examples of the coagulant include inorganic acids such as hydrochloric acid, sulfuric acid, nitric acid, and phosphoric acid; organic acids such as formic acid and acetic acid; and inorganic salts such as aluminium sulfate, magnesium sulfate, calcium acetate, and calcium sulfate.

The thermoplastic resin composition of the present invention comprises the thermoplastic resin and the additive for a thermoplastic resin of the present invention.

Examples of the thermoplastic resin in the present invention include a polyolefin resin, a polyvinyl chloride resin, a polyester resin, a polycarbonate resin, an acrylic resin, a polystyrene resin, and a polyamide resin.

Also, there are included thermoplastic elastomers such as polyolefin elastomers and styrene-based elastomers.

These thermoplastic resins may be used alone or in combination.

In these thermoplastic resins, polyolefin resins and thermoplastic elastomers are preferable from the viewpoint of excellent effect of improvement of the melt tension of the thermoplastic resin composition provided and excellent effect of improvement of flame resistance of the shaped article provided.

The polyolefin resin in the present invention means the homopolymer of an olefin or the copolymer of a monomer mixture containing an olefin as a main component. Examples of the olefin include ethylene, propylene, 1-butene, 1-hexene, 1-decene, 1-octene, and 4-methyl-1-pentene.

Examples of the polyolefin resin include low density polyethylene, high density polyethylene, polypropylene, ethylene/propylene copolymers, polymethylpentene, polybutene, and mixed resins of the resins.

Also, the polyolefin resin includes polyolefin elastomers such as ethylene elastomers and propylene elastomers.

These polyolefin resins may be used alone or in combination.

In these polyolefin resins, it is preferable using low density polyethylene, high density polyethylene, polypropylene, ethylene/propylene copolymers and polyolefin elastomers, and is more preferable using polypropylene and polyolefin elastomers, from the viewpoint of excellent effect of improvement of the melt tension of the thermoplastic resin composition provided.

The flowability of the polyolefin resin in the present invention is preferably the melt flow rate of 0.1 to 70 g/10 minutes and more preferably the melt flow rate of 0.2 to 35 g/10 minutes.

When the melt flow rate of the polyolefin resin is 0.1 g/10 minutes or more, the thermoplastic resin composition provided is excellent in formability.

In addition, when the melt flow rate of the polyolefin resin is 70 g/10 minutes or less, the thermoplastic resin composition provided is excellent in effect of improvement of a melt tension.

It is noted that the melt flow rate is determined based on ASTM D 1238.

In the concrete, the melt flow rate is determined in the condition that the thermoplastic resin is melted with heating at a prescribed temperature, based on the kind of the thermoplastic resin, which is 190° C. with the polyethylene resin and 230° C. with the polypropylene resin for example, under the load of 2.16 kg.

The thermoplastic resin composition of the present invention preferably comprises 0.01 to 20 parts by mass of the amount of the additive for a thermoplastic resin, and more preferably comprises 0.1 to 18 parts by mass of the additive for a thermoplastic resin, for 100 parts of the thermoplastic resin composition.

When the amount of the additive for a thermoplastic resin is 0.01 parts by mass or more, the thermoplastic resin composition provided is excellent in formability and the shaped article provided is excellent in flame retardance.

When the amount of the additive for a thermoplastic resin is 20 parts by mass or less, tetrafluoroethylene polymer (A) is excellent in dispersibility in the thermoplastic resin and the shaped article provided is excellent in restraint of reduction of surface appearance.

The thermoplastic resin composition of the present invention may comprise additives such as a flame retardant, filler, stabilizer, lubricant, and foaming agent if necessary.

Specifically, the additive for a thermoplastic resin of present invention is preferably blended with the thermoplastic resin together with a flame retardant because flame retardance of the shaped article provided is improved conspicuously.

Examples of the flame retardant include halogen-type flame retardants such as tetrabromobisphenol A, decabromodiphenyl ether, hexabromocyclododecane, bis (tetrabromophthalimide) ethane, brominated polystyrene, and hexabromobenzene; phosphate-type flame retardants such as triphenyl phosphate, tricresyl phosphate, trixylenyl phosphate, cresylphenyl phosphate, and 2-ethylhexyldiphenyl phosphate; phosphoric acid salt-type flame retardants such as polyphosphoric acid ammonium salt and polyphosphoric acid melamine salt; and inorganic flame retardants such as antimony trioxide, antimony pentoxide, aluminium hydroxide, magnesium hydroxide, zinc oxide, and iron oxide.

These flame retardants may be used alone or in combination.

In these flame retardants, it is preferable using halogen-type flame retardants, phosphate-type flame retardants, or phosphoric acid salt-type flame retardants, more preferable using phosphate-type flame retardants or phosphoric acid salt-type flame retardants from the viewpoint of environmental loading, and further more preferable using phosphoric acid salt-type flame retardants from the viewpoint that the shaped article provided is excellent in flame retardance.

In addition, in phosphoric acid salt-type flame retardants, polyphosphoric acid melamine salt-type flame retardant is preferable from the viewpoint that the flame retardant is excellent in heat resistance and the shaped article provided is excellent in restraint of coloring.

Examples of the polyphosphoric acid melamine salt-type flame retardant include "ADK STB FP-2200" and "ADK STB FP-2100J" (trade names, made in ADEKA Corporation), and "MELAPUR 200" and "MELAPUR 70" (trade names, made in BASF Japan Ltd.).

Though the amount of the flame retardant depends on a kind, it is preferably 3 to 50 parts by mass and more preferably 5 to 30 parts by mass, for 100 parts by mass of the thermoplastic resin.

When the amount of the flame retardant is 3 parts by mass or more, the shaped article provided is excellent in flame retardance.

When the amount of the flame retardant is 50 parts by mass or less, original properties of the thermoplastic resin are not lost.

Examples of the filler include calcium carbonate, talc, glass fiber, carbon fiber, magnesium carbonate, mica, kaolin, calcium sulfate, barium sulfate, titanium white, white carbon, and carbon black.

These fillers may be used alone or in combination.

Examples of the stabilizer include phenolic antioxidants such as pentaerythrityl-tetrakis-[3-(3,5-di-t-butyl-4-hydroxyphenyl) propionate] and triethylene glycol-bis-[3-(3-t-butyl-5-methyl-4-hydroxyphenyl) propionate]; phosphorus antioxidants such as tris (monononylphenyl) phosphite and tris-(2,4-di-t-butylphenyl) phosphite; sulfur antioxidants such as dilauryl thiodipropionate; Hindered amine light stabilizers such as "TINUVIN 770" (trade name, made in BASF Japan Ltd.) and "ADK STB LA-57" (trade name, made in ADEKA Corporation); and ultraviolet absorbers such as "TINUVIN 1577FF" (trade name, made in BASF Japan Ltd.) and "ADK STB LA-32" (trade name, made in Adeka Corporation).

These stabilizers may be used alone or in combination.

An example of the lubricant include sodium, calcium or magnesium salt of lauryl acid, palmitic acid, oleic acid, or stearic acid.

The lubricant may be used alone or in combination.

For the foaming agent, well-known foaming agents may be used.

Examples of the foaming agent include inorganic foaming agents, volatile foaming agents and decomposable foaming agents.

Examples of the inorganic foaming agent include carbon dioxide, air and nitrogen.

Examples of the volatile foaming agent include aliphatic hydrocarbons such as propane, n-butane, i-butane, pentane, and hexane; cyclic aliphatic hydrocarbons such as cyclobutane and cyclopentane; and halogenated hydrocarbons such as trichlorofluoromethane, dichlorodifluoromethane, dichlorotetrafluoroethane, methyl chloride, ethyl chloride, and methylene chloride.

Examples of the decomposable foaming agent include azodicarboxylic acid amide, dinitrosopentamethylenetetramine, azobisisobutyronitrile, and sodium bicarbonate.

These foaming agents may be used alone or in combination.

Though the amount of the foaming agent depends on a kind, it is preferably 0.1 to 25 parts by mass for 100 parts by mass of the thermoplastic resin.

When the amount of the foaming agent is 0.1 parts by mass or more, an effect as the foaming agent is provided.

In addition, when the specific gravity of the foaming agent is 25 parts by mass or less, stable foaming is possible.

For a blending method of the thermoplastic resin composition of the present invention, well-known blending methods may be applied.

Examples of the blending method include melt-kneading methods such as extrusion kneading and roll kneading.

There is not limited a method for obtaining the thermoplastic resin composition of the present invention.

There may be blended in lump-sum the thermoplastic resin, the additive for a thermoplastic resin of the present invention, and the additive such as the flame retardant if necessary.

Also, the thermoplastic resin composition of the present invention may be obtained with the following method.

At first, a master batch is obtained with blending of a part of the thermoplastic resin, the whole quantity of the additive for a thermoplastic resin of the present invention, and the whole quantity of the additive such as the flame retardant if necessary.

Then, the master batch and the remaining thermoplastic resin are blended.

The shaped article of the present invention is obtained with shaping of the thermoplastic resin composition of the present invention.

For a shaping method of the thermoplastic resin composition of the present invention, well-known shaping methods may be applied.

Examples of the shaping method include extrusion molding, injection molding, calendering, blow molding, thermoforming, foaming, vacuum forming, and melt spinning.

The shaped article of the present invention is excellent in surface appearance, so that it is suitable for materials such as sheet materials like optical sheets, film materials like food films, materials for household appliances, materials for OA machineries, automotive materials, medical materials, construction materials, and covering materials for electric wires.

Specifically, the shaped article of the present invention is excellent in flame retardance, so that it is suitable for materials such as materials for household appliances, materials for OA machineries, automotive materials, and covering materials for electric wires.

EXAMPLES

The present invention is described with embodiments as follows, but the present invention is not limited to these embodiments.

It is noted that "parts" and "%" in embodiments eman "parts by mass" and "% by mass" respectively.

Evaluations in Examples and Comparative examples were carried out with the following methods.
(1) Conversion A latex sample was prepared with dilution of 1 g of the latex of alkyl methacrylate polymer (B) provided with 10 g of acetone.

There is measured the amount of monomer component (b) remained in the latex sample with the use of a gas chromatograph (model "7890", made in Agilent Technologies Inc.) and a column (trade name "HP-5", made in Agilent Technologies Inc., an inside diameter of 0.25 mm, length of 30 m, and a film thickness of 0.25 μm).

A conversion of monomer component (b) was calculated from the amount of monomer component (b) remained.

Methyl isobutyl ketone was used as an internal control material.

It is noted that conversions in Example 2 and Comparative example 4 were calculated from measuring of latices of additives for a thermoplastic resin as latex samples.
(2) Mass Average Particle Size A latex sample was prepared with dilution of the latex of alkyl methacrylate polymer (B) provided with deionized water.

A mass average particle size was measured with the use of a particle size distribution meter (model "CHDF-2000", made in Matec Instrument Companies).

The measurement was carried out with the standard condition recommended by Matec Instrument Companies.

That is to say, there was used an exclusive capillary-type cartridge for particle separation, liquid property was set in neutral, there was used a measuring condition with a flow rate of 1.4 mL/min, pressure of approximately 4,000 psi (2,600 KPa) and temperature of 35° C., and there was used for measurement 0.1 mL of a diluted sample with solid concentration of approximately 3% of a latex.

For the standard material of a particle size, there were used 12 kinds of mono disperse polystyrene, of which particle sizes were known, in the range of 20 to 800 nm as standard materials.

It is noted that mass average particle sizes in Example 2 and Comparative example 4 were measured with the use of latices of additives for a thermoplastic resin as latex samples.

Also, it is noted that the peak other than the peak of a mass average particle size derived from tetrafluoroethylene polymer (A) was determined as the mass average particle size of the alkyl methacrylate polymer (B).
(3) Mass Average Molecular Weight The latex of alkyl methacrylate polymer (B) provided was dried for obtaining of a solid component and a soluble part with tetrahydrofuran in the solid component was used as a sample.

A mass average molecular weight was measured with the use of a gel permeation chromatograph (model "HLC-8220", made in Tosoh Corp.) and a column (trade name "TSK-GEL SUPER HZM-M", made in Tosoh Corp.).

The measurement was carried out at 40° C. with the use of tetrahydrofuran as an eluant.

Mass mean molecular weight was determined with the use of a calibration curve provided with standard polystyrenes.

It is noted that mass average molecular weights in Example 2 and Comparative example 4 were measured with the use of latices of additives for a thermoplastic resin as latex samples.
(4) Handling Property of Powder An additive for a thermoplastic resin provided was passed through a sieve of 8 mesh, and the amount of passing of the sieve was determined, then handling property of powder was evaluated in the following standards.
A: 80% or more of the amount of passing of the sieve
B: 65% or more and less than 80% of the amount of passing of the sieve
C: 50% or more and less than 65% of the amount of passing of the sieve
D: less than 50% of the amount of passing of the sieve
(5) Melt Tension A thermoplastic resin composition provided was extruded with a determined quantity (0.54 cm$^3$/min) with the use of a capillary-type rheometer (model "Rosand capillary rheometer units RH7", made in Malvern Instruments Ltd.) under condition of use of a dice with Φ1.0 mm and L/D ratio of 16 at 190° C., and a strand provided was recovered with a constant speed (3 m/min).

The melt tension of a thermoplastic resin composition is one of indications for determining formabilities such as thermoforming-ability, blow moldability, and form moldability.

Improvement of the melt tension can be considered as improvement of formability.
(6) Melt Flow Rate (MFR)

The melt flow rate of a thermoplastic resin composition provided was measured with the use of a melt indexer (model "L243", made in Takara Thermister Co., Ltd.) based on ASTM D1238.

It is noted that the heating temperature was set at 230° C. which is prescribed as a heating temperature of a polypropylene resin.

(7) Surface Appearance

There were counted numbers of contaminants which exist in a shaped article provided (a film with thickness of 500 µm).

The evaluation was carried out with the following procedure.

There were marked convex parts and recesses visually observed on a surface of a film with 1 m² (0.1 m in width and 10 m in length).

Convex parts and recesses marked were observed with the use of a stereoscopic microscope and only convex parts and recesses derived from agglomerates of tetrafluoroethylene polymer (A) were counted.

Surface appearance was evaluated with the following standards.

It is noted that there can be confirmed whether or not the uneven part is derived from the agglomerate of tetrafluoroethylene polymer (A).

A: Numbers of convex parts and recesses are 100 or less.
B: Numbers of convex parts and recesses are 101 to 300.
C: Numbers of convex parts and recesses are 301 to 1,000.
D: Numbers of convex parts and recesses are 1,001 or more.

Numbers of convex parts and recesses of a shaped article show one of indications for determining dispersibility of tetrafluoroethylene polymer (A) in a thermoplastic resin and surface appearance of the shaped article.

Dispersibility and surface appearance are more excellent as numbers of convex parts and recesses of the shaped article are fewer.

(8) Flame Retardance

The flame retardance of a shaped article provided (a test bar of 1/16 inches) was evaluated based on the examination of UL94V.

Example 1

In a separable flask equipped with a thermometer, nitrogen introduction pipe, condenser and stirrer, 176 parts of water, 2 parts of sodium dodecylbenzenesulfonate, 0.00016 parts of ferrous sulfate, 0.00048 parts of ethylenediamine tetraacetic acid disodium salt, and 0.384 parts of ascorbic acid were added and the inside of the flask was substituted with nitrogen.

Subsequently, the inner temperature was raised at 73° C.

Then, the monomer mixture of 78.4 parts of i-butyl methacrylate, 1.6 parts of ethyl acrylate, 0.16 parts of cumene hydroperoxide, and 0.8 parts of n-octyl mercaptan was titrated for 1 hour and maintained for 1 hour at the same temperature as the above temperature.

As a result, the latex of alkyl methacrylate polymer (B1) was obtained.

Conversion of the monomer was 99.9% or more from a gas chromatograph.

Alkyl methacrylate polymer (B1) obtained had a mass average particle size of 70 nm and a mass average molecular weight of 30,000.

Subsequently, the inner temperature was set at 40° C.

In 80 parts (as the solid content of alkyl methacrylate polymer (B1)) of the latex of alkyl methacrylate polymer (B1) provided, 20 parts (as the solid content of tetrafluoroethylene polymer (A)) of "Fluon AD939L" (trade name, made in Asahi Glass Co., Ltd., the mass average particle size of 300 nm and the solid content of 60% by mass) as the latex of tetrafluoroethylene polymer (A) was titrated and the mixture was stirred for 1 hour.

After cooling of the above mixture to 25° C., the latex mixture was titrated in 320 parts of water of 50° C. containing 5 parts of calcium acetate and the temperature was raised to 90° C. to be coagulated.

A coagulate obtained was separated and washed, and was dried for 12 hours at 60° C.

As a result, additive for a thermoplastic resin (1) was obtained.

The additive for a thermoplastic resin obtained was excellent in handling property of powder.

Example 2

In a separable flask equipped with a thermometer, nitrogen introduction pipe, condenser and stirrer, 20 parts (as the solid content of tetrafluoroethylene polymer (A)) of "Fluon AD939L" as the latex of tetrafluoroethylene polymer (A), 176 parts of water, 2 parts of sodium dodecylbenzenesulfonate, 0.00016 parts of ferrous sulfate, 0.00048 parts of ethylenediamine tetraacetic acid disodium salt and 0.384 parts of ascorbic acid were added, and the inside of the flask was substituted with nitrogen.

Subsequently, the inner temperature was raised at 73° C.

Then, the monomer mixture of 78.4 parts of i-butyl methacrylate, 1.6 parts of ethyl acrylate, 0.16 parts of cumene hydroperoxide, and 0.8 parts of n-octyl mercaptan was titrated for 1 hour and maintained for 1 hour at the same temperature as the above temperature.

As a result, a latex containing tetrafluoroethylene polymer (A) and alkyl methacrylate polymer (B) was obtained.

Conversion of the monomer was 99.9% or more from a gas chromatograph.

After cooling of the latex obtained to 25° C., the latex was titrated in 320 parts of water of 50° C. containing 5 parts of calcium acetate and the temperature was raised to 90° C. to be coagulated.

A coagulate obtained was separated and washed, and was dried for 12 hours at 60° C.

As a result, additive for a thermoplastic resin (2) was obtained.

Example 3

Additive for a thermoplastic resin (3) was obtained in the same manner as in Example 1 except that the amount of sodium dodecylbenzenesulfonate was changed from 2 parts to 0.8 parts.

Example 4

Additive for a thermoplastic resin (4) was obtained in the same manner as in Example 1 except that the amount of n-octyl mercaptan was changed from 0.8 parts to 0.16 parts.

Example 5

Additive for a thermoplastic resin (5) was obtained in the same manner as in Example 1 except that 0.8 parts of n-octyl mercaptan was not added.

Example 6

Additive for a thermoplastic resin (6) was obtained in the same manner as in Example 1 except that 78.4 parts of i-butyl methacrylate was changed to 70.4 parts of i-butyl methacrylate and 8 parts of methyl methacrylate.

Example 7

Additive for a thermoplastic resin (7) was obtained in the same manner as in Example 1 except that 78.4 parts of i-butyl methacrylate was changed to 62.4 parts of i-butyl methacrylate and 16 parts of methyl methacrylate.

Example 8

Additive for a thermoplastic resin (8) was obtained in the same manner as in Example 1 except that i-butyl methacrylate was changed to n-butyl methacrylate.

Example 9

Alkyl methacrylate polymer (B1) was obtained in the same manner as in Example 1.

In 95 parts (as the solid content of alkyl methacrylate polymer (B1)) of the latex of alkyl methacrylate polymer (B1) obtained, 5 parts (as the solid content of tetrafluoroethylene polymer (A)) of "Fluon AD939L" as the latex of tetrafluoroethylene polymer (A) was titrated, and the mixture was stirred for 1 hour.

After cooling of the above mixture to 25° C., the latex mixture was titrated in 320 parts of water of 50° C. containing 5 parts of calcium acetate and the temperature was raised to 90° C. to be coagulated.

A coagulate obtained was separated and washed, and was dried for 12 hours at 60° C.

As a result, additive for a thermoplastic resin (9) was obtained.

Example 10

Alkyl methacrylate polymer (B1) was obtained in the same manner as in Example 1.

In 50 parts (as the solid content of alkyl methacrylate polymer (B1)) of the latex of alkyl methacrylate polymer (B1) obtained, 50 parts (as the solid content of tetrafluoroethylene polymer (A)) of "Fluon AD939L" as the latex of tetrafluoroethylene polymer (A) was titrated, and the mixture was stirred for 1 hour.

After cooling of the above mixture to 25° C., the latex mixture was titrated in 375 parts of water of 80° C. containing 0.175 parts of aluminium sulfate and the temperature was raised to 90° C. to be coagulated.

A coagulate obtained was separated and washed, and was dried for 12 hours at 60° C.

As a result, additive for a thermoplastic resin (10) was obtained.

Example 11

Additive for a thermoplastic resin (11) was obtained in the same manner as in Example 10 except that the amount of n-octyl mercaptan was changed from 0.5 parts to 0.1 parts.

Comparative Example 1

Additive for a thermoplastic resin (12) was obtained in the same manner as in Example 1 except that i-butyl methacrylate was changed to methyl methacrylate.

Comparative Example 2

The mixture of 174 parts of water, 78.4 parts of 2-ethylhexy methacrylate, 1.6 parts of ethylacrylate, 2 parts of sodium dodecylbenzenesulfonate, and 0.8 parts of n-octyl mercaptan was stirred in a homomixer with 10,000 rpm for 2 minutes, and then the mixture was passed through a homogenizer with 2 times under pressure of 30 MPa.

As a result, a stable pre-dispersion liquid was obtained.

In the pre-dispersion liquid, 0.16 parts of cumene hydroperoxide was added and the mixture was stirred sufficiently.

Then, the above liquid was added in a separable flask equipped with a thermometer, nitrogen introduction pipe, condenser and stirrer and the liquid was raised to 60° C.

When the temperature of the liquid was arrived at 60° C., there was added an aqueous solution that 0.00016 parts of ferrous sulfate, 0.00048 parts of ethylenediamine tetraacetic acid disodium salt, and 0.384 parts of ascorbic acid were dissolved in 2 parts of water and polymerization was initiated, then a system was maintained at 60° C. for 2 hours.

Conversion of the monomer was 99.9% or more from a gas chromatograph.

Subsequently, the inner temperature was set at 40° C.

In 80 parts (as the solid content of alkyl methacrylate polymer (B2)) of the latex of alkyl methacrylate polymer (B2) obtained, 20 parts (as the solid content of tetrafluoroethylene polymer (A)) of "Fluon AD939L" as the latex of tetrafluoroethylene polymer (A) was titrated and the mixture was stirred for 1 hour.

After cooling of the above mixture to 25° C., the latex mixture was titrated in 320 parts of water of 50° C. containing 5 parts of calcium acetate and the temperature was raised to 90° C. to be coagulated.

A coagulate obtained was separated and washed, and was dried for 12 hours at 60° C.

As a result, additive for a thermoplastic resin (13) was obtained.

However, it was poor in handling property of powder, so that evaluation was discontinued.

Comparative Example 3

Additive for a thermoplastic resin (14) was obtained in the same manner as in Example 1 except that 78.4 parts of i-butyl methacrylate was changed to 16 parts of i-butyl methacrylate and 62.4 parts of methyl methacrylate.

Comparative Example 4

The mixture of 240 parts of water, 30 parts of dodecyl methacrylate, 28.8 parts of methyl methacrylate, 1.2 parts of ethyl acrylate, 1.5 parts of sodium dodecylbenzenesulfonate, and 0.6 parts of n-octyl mercaptan was stirred in a homomixer with 10,000 rpm for 2 minutes, and then the mixture was passed through a homogenizer with 2 times under pressure of 30 MPa.

As a result, a stable pre-dispersion liquid was obtained.

In the pre-dispersion liquid, 0.12 parts of cumene hydroperoxide was added and the mixture was stirred sufficiently.

Then, the above liquid was added in a separable flask equipped with a thermometer, nitrogen introduction pipe, condenser and stirrer and the liquid was raised to 60° C.

When the temperature of the liquid was arrived at 60° C., there was added an aqueous solution that 0.00012 parts of ferrous sulfate, 0.00036 parts of ethylenediamine tetraacetic acid disodium salt and 0.288 parts of ascorbic acid were dissolved in 2 parts of water, and polymerization was initiated, then a system was maintained at 60° C. for 2 hours.

Subsequently, 20 parts (as the solid content of tetrafluoroethylene polymer (A)) of "Fluon AD939L" as the latex of tetrafluoroethylene polymer (A) was added and the mixture was stirred for 1 hour.

Then, the mixture was raised at 80° C., and there were added in the mixture 0.5 parts of sodium dodecylbenzenesulfonate and an aqueous solution that 0.00004 parts of ferrous sulfate, 0.00012 parts of ethylenediamine tetraacetic acid disodium salt and 0.096 parts of ascorbic acid were dissolved in 2 parts of water.

Then, the monomer mixture of 19.6 parts of methyl methacrylate, 0.4 parts of ethylacrylate and 0.2 parts of n-octyl mercaptan was titrated for 1 hour in the above liquid, and a mixture was maintained for 1 hour at the same temperature.

As a result, a latex containing tetrafluoroethylene polymer (A) and alkyl methacrylate polymer (B) was obtained.

Conversion of the monomer was 99.9% or more from a gas chromatograph.

After cooling of the latex obtained to 25° C., the latex was titrated in 320 parts of water of 50° C. containing 5 parts of calcium acetate and the temperature was raised to 90° C. to be coagulated.

A coagulate obtained was separated and washed, and was dried for 12 hours at 60° C.

As a result, additive for a thermoplastic resin (15) was obtained.

Comparative Example 5

Additive for a thermoplastic resin (16) was obtained in the same manner as in Example 9 except that i-butyl methacrylate was changed to methyl methacrylate.

Comparative Example 6

Additive for a thermoplastic resin (17) was obtained in the same manner as in Example 10 except that i-butyl methacrylate was changed to methyl methacrylate.

There are shown in Table 1 and Table 2 compositions of monomer component (b) used, mass average particle sizes and mass average molecular weights of all of alkyl methacrylate polymer (B), and processes for producing and handling properties of powder of additives for thermoplastic resins.

TABLE 1

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Additive for a thermoplastic resin | | (1) | (2) | (3) | (4) | (5) | (6) | (7) | (8) | (9) | (10) | (11) |
| Tetrafluoroethylene polymer (A) | (part) | 20 | 20 | 20 | 20 | 20 | 20 | 20 | 20 | 5 | 50 | 50 |
| Alkyl methacrylate polymer (B) | MMA (part) | — | — | — | — | — | 8 | 16 | — | — | — | — |
| | n-BMA (part) | — | — | — | — | — | — | — | 78.4 | — | — | — |
| | i-BMA (part) | 78.4 | 78.4 | 78.4 | 78.4 | 78.4 | 70.4 | 62.4 | — | 93.1 | 49 | 49 |
| | 2-EHMA (part) | — | — | — | — | — | — | — | — | — | — | — |
| | DMA (part) | — | — | — | — | — | — | — | — | — | — | — |
| | EA (part) | 1.6 | 1.6 | 1.6 | 1.6 | 1.6 | 1.6 | 1.6 | 1.6 | 1.9 | — | — |
| | n-BA (part) | — | — | — | — | — | — | — | — | — | 1 | 1 |
| Average particle size | (nm) | 70 | 70 | 120 | 70 | 70 | 70 | 70 | 70 | 70 | 70 | 70 |
| mass average molecular weight | (—) | 30 thousand | 30 thousand | 30 thousand | 280 thousand | 1,200 thousand | 30 thousand | 30 thousand | 30 thousand | 30 thousand | 30 thousand | 280 thousand |
| Process for producing | | X | Y | X | X | X | X | X | X | X | X | X |
| Handling property of powder | | A | A | A | A | A | A | A | B | A | A | A |

TABLE 2

| | | Comparative example 1 | Comparative example 2 | Comparative example 3 | Comparative example 4 | Comparative example 5 | Comparative example 6 |
|---|---|---|---|---|---|---|---|
| Additive for a thermoplastic resin | | (12) | (13) | (14) | (15) | (16) | (17) |
| Tetrafluoroethylene polymer (A) | (part) | 20 | 20 | 20 | 20 | 5 | 50 |
| Alkyl methacrylate polymer (B) | MMA (part) | 78.4 | — | 62.4 | 48.4 | 93.1 | 49 |
| | n-BMA (part) | — | — | 16 | — | — | — |
| | i-BMA (part) | — | — | — | — | — | — |
| | 2-EHMA (part) | — | 78.4 | — | — | — | — |
| | DMA (part) | — | — | — | 30 | — | — |
| | EA (part) | 1.6 | 1.6 | 1.6 | 1.6 | 1.9 | — |
| | n-BA (part) | — | — | — | — | — | 1 |
| Average particle size | (nm) | 70 | 160 | 70 | 220 | 70 | 70 |
| mass average molecular weight | (—) | 30 thousand | 30 thousand | 30 thousand | 30 thousand | 30 thousand | 30 thousand |
| Process for producing | | X | X | X | X, Y | X | X |
| Handling property of powder | | A | D | A | A | A | A |

It is noted that abbreviations described in Table 1 and Table 2 show the following compounds.

MMA: methyl methacrylate
n-BMA: n-butyl methacrylate
i-BMA: i-butyl methacrylate
2-EHMA: 2-ethylhexyl methacrylate
DMAF: dodecyl methacrylate
EA: ethyl acrylate
n-BA: normal butyl acrylate In addition, abbreviations described in the column of "Process for producing" show the following processes for producing additives for a thermoplastic resin.

X: a latex-blending method
Y: a method of polymerization with existence

As it is apparent from Table 1 and 2, additives for a thermoplastic resin (1) to (11) provided with Example 1 to 11 were excellent in handling property of powder.

On the other hand, additive for a thermoplastic resin (13) provided with Comparative example 2 was obtained with the use of alkyl methacrylate polymer (B) which mainly contains monomer units of alkyl methacrylate that carbon numbers of alkyl group is bigger than an extent of the present invention, so that alkyl methacrylate polymer (B) had low glass transition temperature and was inferior to handling property of powder.

Production Examples 1 to 2

A thermoplastic resin and additives for a thermoplastic resin were blended with hand at ratios described in Table 3.

Then, each of the above mixture was extruded with a screw speed of 200 rpm at a cylinder temperature of 200° C. with the use of a twin-screw extruder with 30 mmΦ (made in Research Laboratory of Plastics Technology Co., Ltd., L/D ratio=30).

As a result, master batches (M1) and (M2) were obtained.

It is noted that there was used polypropylene (trade name "NOVATEC-PP FY4", made in Japan Polypropylene Corporation) as the thermoplastic resin.

Compositions of master batches obtained in Production examples are shown in Table 3.

TABLE 3

|  |  | Production example 1 | Production example 2 |
|---|---|---|---|
| Master batch |  | (M1) | (M2) |
| Thermoplastic resin | (part) | 80 | 92 |
| Additive for a thermoplastic resin | kind | (1) | (10) |
| Concentration of tetrafluoroethylene polymer (A) in the master batch | (part) (%) | 20 4 | 8 4 |

Examples 12 to 30, and Comparative Examples 7 to 20

Thermoplastic resins and additives for a thermoplastic resin were blended with hand at ratios described in Tables 4 to 9.

Then, each of the above mixtures was extruded with the use of a twin-screw extruder with 30 mmΦ (made in Research Laboratory of Plastics Technology Co., Ltd., L/D ratio=30) with the conditions of a screw speed of 200 rpm and a cylinder temperature of 200° C.

As a result, thermoplastic resin compositions were obtained.

Thermoplastic resin compositions provided were dried at 80° C. for 12 hours.

Then, each of shaped articles (films) with a thickness of 500 μm and a width of 0.1 m was obtained with the use of a single-screw extruder (made in GM Engineering, Inc., L/D ratio=30) with the condition of a screw speed of 20 rpm, a cylinder temperature of 200° C. and a T-die temperature of 210° C.

In addition, thermoplastic resins, a flame retardant and additives for a thermoplastic resin were blended with hand at ratios described in Tables 4 to 9.

Then, each of the above mixtures was extruded with the use of a twin-screw extruder with 30 mmΦ (made in Research Laboratory of Plastics Technology Co., Ltd., L/D ratio=30) with the conditions of a screw speed of 200 rpm and a cylinder temperature of 200° C.

As a result, thermoplastic resin compositions were obtained.

It is noted that there was used as a flame retardant a phosphate salt type flame retardant (trade name "ADK STB FP-2200", made in Adeka Corporation).

Thermoplastic resin compositions obtained were dried at 80° C. for 12 hours.

Then, each of shaped articles (test bars of 1/16 inch) was obtained with the use of a 100 t-injection molding machine (model "SE-100DU", made in Sumitomo Heavy Industries, Ltd.) at a molding temperature of 200° C.

Compositions, melt tensions and MFR of thermoplastic resin compositions, and surface appearances and flame retardances of shaped articles are shown in Table 4 to 9.

TABLE 4

|  |  |  | Example 12 | Example 13 | Example 14 | Example 15 | Example 16 | Example 17 | Example 18 | Example 19 |
|---|---|---|---|---|---|---|---|---|---|---|
| Thermoplastic resin | PP1 | (part) | 100 | 100 | 100 | 100 | 100 | 100 | 100 | 100 |
|  | PP2 | (part) | — | — | — | — | — | — | — | — |
|  | SEBS | (part) | — | — | — | — | — | — | — | — |
| Additive for a thermoplastic resin | kind | | (1) | (2) | (3) | (4) | (5) | (6) | (7) | (8) |
|  | (part) | | 0.5 | 0.5 | 0.5 | 0.5 | 0.5 | 0.5 | 0.5 | 0.5 |
| Concentration of tetrafluoroethylene polymer (A) in a master batch | (%) | | 0.1 | 0.1 | 0.1 | 0.1 | 0.1 | 0.1 | 0.1 | 0.1 |
| Melt tension | | (N) | 0.0213 | 0.0209 | 0.0210 | 0.0209 | 0.0209 | 0.0210 | 0.0200 | 0.0211 |
| MFR | | (g/10 minutes) | 4.73 | 4.42 | 4.77 | 4.72 | 4.70 | 4.71 | 4.62 | 4.77 |
| Surface appearance | Numbers of uneven parts | (numbers/m²) | 4 | 27 | 18 | 98 | 146 | 221 | 460 | 111 |
|  | Judge | (—) | A | A | A | A | B | B | C | B |

TABLE 4-continued

|  |  |  | Example 12 | Example 13 | Example 14 | Example 15 | Example 16 | Example 17 | Example 18 | Example 19 |
|---|---|---|---|---|---|---|---|---|---|---|
| Thermoplastic resin | PP1 | (part) | 82 | 82 | 82 | 82 | 82 | 82 | 82 | 82 |
|  | PP2 | (part) | — | — | — | — | — | — | — | — |
|  | SEBS | (part) | — | — | — | — | — | — | — | — |
| Flame retardant |  | (part) | 18 | 18 | 18 | 18 | 18 | 18 | 18 | 18 |
| Additive for a thermoplastic resin |  | kind | (1) | (2) | (3) | (4) | (5) | (6) | (7) | (8) |
|  |  | (part) | 0.5 | 0.5 | 0.5 | 0.5 | 0.5 | 0.5 | 0.5 | 0.5 |
| Concentration of tetrafluoroethylene polymer (A) in a master batch |  | (%) | 0.1 | 0.1 | 0.1 | 0.1 | 0.1 | 0.1 | 0.1 | 0.1 |
| Flame retardance | Combustion time | (second) | 28 | 33 | 31 | 31 | 36 | 41 | 40 | 34 |
|  | Judge | (—) | V-0 | V-0 | V-0 | V-0 | V-0 | V-1 | V-1 | V-0 |

TABLE 5

|  |  |  | Comparative example 7 | Comparative example 8 | Comparative example 9 | Comparative example 20 | Comparative example 21 | Comparative example 10 | Comparative example 11 |
|---|---|---|---|---|---|---|---|---|---|
| Thermoplastic resin | PP1 | (part) | 100 | 100 | 100 | 100 | 100 | 100 | 100 |
|  | PP2 | (part) | — | — | — | — | — | — | — |
|  | SEBS | (part) | — | — | — | — | — | — | — |
| Additive for a thermoplastic resin |  | kind | (12) | (14) | (15) | (10) | (11) | (17) | — |
|  |  | (part) | 0.5 | 0.5 | 0.5 | 0.2 | 0.2 | 0.2 | 0 |
| Concentration of tetrafluoroethylene polymer (A) in a master batch |  | (%) | 0.1 | 0.1 | 0.1 | 0.1 | 0.1 | 0.1 | 0 |
| Melt tension |  | (N) | 0.0205 | 0.0203 | 0.0210 | 0.0204 | 0.0201 | 0.0201 | 0.0173 |
| MFR |  | (g/10 minutes) | 4.70 | 4.81 | 4.74 | 4.73 | 4.71 | 4.68 | 4.75 |
| Surface appearance | Numbers of uneven parts | (numbers/m$^2$) | 1980 | 1630 | 340 | 260 | 420 | 1860 | 0 |
|  | Judge | (—) | D | D | C | B | C | D | A |
| Thermoplastic resin | PP1 | (part) | 82 | 82 | 82 | 82 | 82 | 82 | 82 |
|  | PP2 | (part) | — | — | — | — | — | — | — |
|  | SEBS | (part) | — | — | — | — | — | — | — |
| Flame retardant |  | (part) | 18 | 18 | 18 | 18 | 18 | 18 | 18 |
| Additive for a thermoplastic resin |  | kind | (12) | (14) | (15) | (10) | (11) | (17) | — |
|  |  | (part) | 0.5 | 0.5 | 0.5 | 0.2 | 0.2 | 0.2 | 0 |
| Concentration of tetrafluoroethylene polymer (A) in a master batch |  | (%) | 0.1 | 0.1 | 0.1 | 0.1 | 0.1 | 0.1 | 0 |
| Flame retardance | Combustion time | (second) | 245 | 238 | 246 | 21 | 23 | 248 | 261 |
|  | Judge | (—) | Fail | Fail | Fail | V-0 | V-0 | Fail | Fail |

TABLE 6

|  |  |  | Example 22 | Comparative example 12 | Example 23 | Comparative example 13 | Comparative example 14 | Example 24 | Comparative example 15 | Example 25 | Comparative example 16 | Comparative example 17 |
|---|---|---|---|---|---|---|---|---|---|---|---|---|
| Thermoplastic resin | PP1 | (part) | — | — | — | — | — | 80 | 80 | 80 | 80 | 80 |
|  | PP2 | (part) | 100 | 100 | 100 | 100 | 100 | — | — | — | — | — |
|  | SEBS | (part) | — | — | — | — | — | 20 | 20 | 20 | 20 | 20 |
| Additive for a thermoplastic resin | | kind | (1) | (12) | (10) | (17) | — | (1) | (12) | (10) | (17) | — |
|  |  | (part) | 0.5 | 0.5 | 0.2 | 0.2 | 0 | 0.5 | 0.5 | 0.2 | 0.2 | 0 |
| Concentration of tetrafluoroethylene polymer (A) in a master batch |  | (%) | 0.1 | 0.1 | 0.1 | 0.1 | 0 | 0.1 | 0.1 | 0.1 | 0.1 | 0 |
| Melt tension |  | (N) | 0.0089 | 0.0088 | 0.0084 | 0.0086 | 0.0072 | 0.0410 | 0.0402 | 0.0408 | 0.0398 | 0.0232 |
| MFR |  | (g/10 minutes) | 9.88 | 9.74 | 9.82 | 9.78 | 9.82 | 5.99 | 5.49 | 5.91 | 5.51 | 5.55 |

TABLE 6-continued

|  |  |  | Example 22 | Comparative example 12 | Example 23 | Comparative example 13 | Comparative example 14 | Example 24 | Comparative example 15 | Example 25 | Comparative example 16 | Comparative example 17 |
|---|---|---|---|---|---|---|---|---|---|---|---|---|
| Surface appearance | Numbers of uneven parts | (numbers/m²) | 64 | 940 | 590 | 2710 | 0 | 1 | 1230 | 82 | 1510 | 0 |
|  | Judge | (—) | A | C | C | D | A | A | D | A | D | A |
| Thermoplastic resin | PP1 | (part) | — | — | — | — | — | 64 | 64 | 64 | 64 | 64 |
|  | PP2 | (part) | 77 | 77 | 77 | 77 | 77 | — | — | — | — | — |
|  | SEBS | (part) | — | — | — | — | — | 16 | 16 | 16 | 16 | 16 |
| Flame retardant |  | (part) | 23 | 23 | 23 | 23 | 23 | 20 | 20 | 20 | 20 | 20 |
| Additive for a thermoplastic resin | kind | | (1) | (12) | (10) | (17) | — | (1) | (12) | (10) | (17) | — |
|  | (part) | | 0.5 | 0.5 | 02 | 0.2 | 0 | 0.5 | 0.5 | 0.2 | 0.2 | 0 |
| Concentration of tetrafluoroethylene polymer (A) in a master batch | (%) | | 0.1 | 0.1 | 0.1 | 0.1 | 0 | 0.1 | 0.1 | 0.1 | 0.1 | 0 |
| Flame retardance | Combustion time | (second) | 39 | 162 | 29 | 217 | 45 | 35 | 278 | 11 | 222 | 214 |
|  | Judge | (—) | V-0 | Fail | V-0 | Fail | Fail | V-0 | Fail | V-0 | Fail | Fail |

TABLE 7

|  |  |  | Example 26 | Example 12 | Example 20 | Comparative example 18 | Comparative example 7 | Comparative example 10 | Comparative example 11 |
|---|---|---|---|---|---|---|---|---|---|
| Thermoplastic resin | PP1 | (part) | 100 | 100 | 100 | 100 | 100 | 100 | 100 |
|  | PP2 | (part) | — | — | — | — | — | — | — |
|  | SEBS | (part) | — | — | — | — | — | — | — |
| Additive for a thermoplastic resin | kind | | (9) | (1) | (10) | (16) | (12) | (17) | — |
|  | (part) | | 2.0 | 0.5 | 0.2 | 2.0 | 0.5 | 0.2 | 0 |
| Concentration of tetrafluoroethylene polymer (A) in a master batch | (%) | | 0.1 | 0.1 | 0.1 | 0.1 | 0.1 | 0.1 | 0 |
| Melt tension |  | (N) | 0.0210 | 0.0213 | 0.0204 | 0.0203 | 0.0205 | 0.0201 | 0.0173 |
| MFR |  | (g/10 minutes) | 4.87 | 4.73 | 4.73 | 4.68 | 4.70 | 4.68 | 4.75 |
| Surface appearance | Numbers of uneven parts | (numbers/m²) | 1 | 4 | 260 | 420 | 1980 | 1860 | 0 |
|  | Judge | (—) | A | A | B | C | D | D | A |
| Thermoplastic resin | PP1 | (part) | 82 | 82 | 82 | 82 | 82 | 82 | 82 |
|  | PP2 | (part) | — | — | — | — | — | — | — |
|  | SEBS | (part) | — | — | — | — | — | — | — |
| Flame retardant |  | (part) | 18 | 18 | 18 | 18 | 18 | 18 | 18 |
| Additive for a thermoplastic resin | kind | | (9) | (1) | (10) | (16) | (12) | (17) | — |
|  | (part) | | 2.0 | 0.5 | 0.2 | 2.0 | 0.5 | 0.2 | 0 |
| Concentration of tetrafluoroethylene polymer (A) in a master batch | (%) | | 0.1 | 0.1 | 0.1 | 0.1 | 0.1 | 0.1 | 0 |
| Flame retardance | Combustion time | (second) | 61 | 28 | 21 | 255 | 245 | 248 | 261 |
|  | Judge | (—) | V-1 | V-0 | V-0 | Fail | Fail | Fail | Fail |

TABLE 8

|  |  |  | Example 12 | Example 27 | Example 28 | Comparative example 7 | Comparative example 19 | Comparative example 20 | Comparative example 11 |
|---|---|---|---|---|---|---|---|---|---|
| Thermoplastic resin | PP1 | (part) | 100 | 100 | 100 | 100 | 100 | 100 | 100 |
|  | PP2 | (part) | — | — | — | — | — | — | — |
|  | SEBS | (part) | — | — | — | — | — | — | — |

TABLE 8-continued

|  |  |  | Example 12 | Example 27 | Example 28 | Comparative example 7 | Comparative example 19 | Comparative example 20 | Comparative example 11 |
|---|---|---|---|---|---|---|---|---|---|
| Additive for a thermoplastic resin | kind | | (1) | (1) | (1) | (12) | (12) | (12) | — |
|  | (part) | | 0.5 | 2 | 5 | 0.5 | 2 | 5 | 0 |
| Concentration of tetrafluoroethylene polymer (A) in a master batch | (%) | | 0.1 | 0.4 | 1.0 | 0.1 | 0.4 | 1.0 | 0 |
| Melt tension | | (N) | 0.0213 | 0.0510 | 0.1280 | 0.0205 | 0.0451 | 0.1210 | 0.0173 |
| MFR | | (g/10 minutes) | 4.73 | 4.60 | 4.48 | 4.70 | 4.42 | 4.36 | 4.75 |
| Surface appearance | Numbers of uneven parts | (numbers/m$^2$) | 4 | 4 | 6 | 1980 | 3620 | 4210 | 0 |
|  | Judge | (—) | A | A | A | D | D | D | A |
| Thermoplastic resin | PP1 | (part) | 82 | 82 | 82 | 82 | 82 | 82 | 82 |
|  | PP2 | (part) | — | — | — | — | — | — | — |
|  | SEBS | (part) | — | — | — | — | — | — | — |
| Flame retardant | | (part) | 18 | 18 | 18 | 18 | 18 | 18 | 18 |
| Additive for a thermoplastic resin | kind | | (1) | (1) | (1) | (12) | (12) | (12) | — |
|  | (part) | | 0.5 | 2 | 5 | 0.5 | 2 | 5 | 0 |
| Concentration of tetrafluoroethylene polymer (A) in a master batch | (%) | | 0.1 | 0.4 | 1.0 | 0.1 | 0.4 | 1.0 | 0 |
| Flame retardance | Combustion time | (second) | 28 | 45 | 55 | 245 | 245 | 253 | 261 |
|  | Judge | (—) | V-0 | V-0 | V-1 | Fail | Fail | Fail | Fail |

TABLE 9

|  |  |  | Example 12 | Example 29 | Example 20 | Example 30 | Comparative example 11 |
|---|---|---|---|---|---|---|---|
| Thermoplastic resin | PP1 | (part) | 100 | 97.5 | 100 | 97.5 | 100 |
|  | PP2 | (part) | — | — | — | — | — |
|  | SEBS | (part) | — | — | — | — | — |
| Additive for a thermoplastic resin | kind | | (1) | (M-1) | (10) | (M-2) | — |
|  | (part) | | 0.5 | 2.5 | 0.2 | 2.5 | 0 |
| Concentration of tetrafluoroethylene polymer (A) in a master batch | (%) | | 0.1 | 0.1 | 0.1 | 0.1 | 0 |
| Melt tension | | (N) | 0.0213 | 0.0210 | 0.0204 | 0.0208 | 0.0173 |
| MFR | | (g/10 minutes) | 4.73 | 4.72 | 4.73 | 4.74 | 4.75 |
| Surface appearance | Numbers of uneven parts | (numbers/m$^2$) | 4 | 2 | 260 | 8 | 0 |
|  | Judge | (—) | A | A | B | A | A |
| Thermoplastic resin | PP1 | (part) | 82 | 80 | 82 | 80 | 82 |
|  | PP2 | (part) | — | — | — | — | — |
|  | SEBS | (part) | — | — | — | — | — |
| Flame retardant | | (part) | 18 | 18 | 18 | 18 | 18 |
| Additive for a thermoplastic resin | kind | | (1) | (M-1) | (10) | (M-2) | — |
|  | (part) | | 0.5 | 2.5 | 0.2 | 2.5 | 0 |
| Concentration of tetrafluoroethylene polymer (A) in a master batch | (%) | | 0.1 | 0.1 | 0.1 | 0.1 | 0 |
| Flame retardance | Combustion time | (second) | 28 | 33 | 21 | 28 | 261 |
|  | Judge | (—) | V-0 | V-0 | V-0 | V-0 | Fail |

It is noted that abbreviations described in Table 4 to 9 show the following compounds.

PP1: polypropylene (trade name "NOVATEC-PP FY4", made in Japan Polypropylene Corporation Co., Ltd., melt flow rate of 5 g/10 minutes)

PP2: polypropylene (trade name "NOVATEC-PP MA3", made in Japan Polypropylene Corporation Co., Ltd., melt flow rate of 12 g/10 minutes)

SEBS: hydrogenated styrene elastomer (trade name "Tuftec H1062", made in JSR Corporation)

As it is apparent from Table 4 and 5, thermoplastic resin compositions provided with Example 12 to 21 were excellent in formability and shaped articles provided were excellent in surface appearances and flame retardances.

On the other hand, shaped articles provided with Comparative example 7, 8 and 10 were provided with the use of alkyl methacrylate polymer (B) which mainly contains monomer units of methyl methacrylate that a carbon number of alkyl group is one, so that all of tetrafluoroethylene polymer (A) were inferior to dispersibility and the shaped articles were inferior to surface appearances and flame retardances.

In addition, the shaped article provided with Comparative example 9 was provided with the use of alkyl methacrylate polymer (B) which mainly contains monomer units of alkyl methacrylates that carbon numbers of alkyl group are one and twelve, so that surface appearance of the shaped article was improved a little compared with shaped articles provided with Comparative examples 7, 8 and 10, but the shaped article was inferior to flame retardance.

In addition, the thermoplastic resin composition provided with Comparative example 11 was not blended with an additive for a thermoplastic resin, so that it was inferior to formability and a shaped article provided was inferior to flame retardance.

As it is apparent from Table 6, it was confirmed that similar effects were developed even when there were used thermoplastic resins different from the thermoplastic resin shown in Tables 4 and 5.

As it is apparent from Table 7, it was confirmed that similar effects were developed even when there were used additives for a thermoplastic resin which have different compositions of tetrafluoroethylene polymer (A) and alkyl methacrylate polymer (B).

As it is apparent from Table 8, it was confirmed that similar effects were developed even when blending amounts of additives for a thermoplastic resin were changed.

As it is apparent from Table 9, it was confirmed that similar effects were developed even when master batches were used.

Industrial Applicability

The shaped article of the present invention is excellent in surface appearance, so that it is suitable for materials such as sheet materials like optical sheets, film materials like food films, materials for household appliances, materials for OA machineries, automotive materials, medical materials, construction materials, and covering materials for electric wires.

Specifically, the shaped article of the present invention is excellent in flame retardance, so that it is suitable for materials such as materials for household appliances, materials for OA machineries, automotive materials, and covering materials for electric wires.

The invention claimed is:

1. A thermoplastic resin composition comprising:
a thermoplastic resin and
an additive for the thermoplastic resin, wherein the additive comprises tetrafluoroethylene polymer (A) and alkyl methacrylate polymer (B) containing 50% by mass or more of units of i-butyl methacrylate.

2. The thermoplastic resin composition according to claim 1, wherein the thermoplastic resin is a polyolefin resin.

3. The thermoplastic resin composition according to claim 1,
further comprising a flame retardant.

4. The thermoplastic resin composition according to claim 1, further comprising a phosphate salt flame retardant.

5. An article produced by shaping the thermoplastic resin composition according to claim 1.

6. An article produced by shaping the thermoplastic resin composition of claim 1 by extrusion molding, injection molding, calendaring, blow molding, thermoforming, foaming, vacuum forming or melt spinning.

7. An article produced by shaping the thermoplastic resin composition of claim 1 selected from the group consisting of a sheet, film, material for a household appliance, automotive material, and covering material for an electric wire.

* * * * *